July 7, 1936.  E. W. LUNDELL  2,046,520
APPARATUS FOR APPLYING NUTS TO BOLTS
Filed Feb. 25, 1935
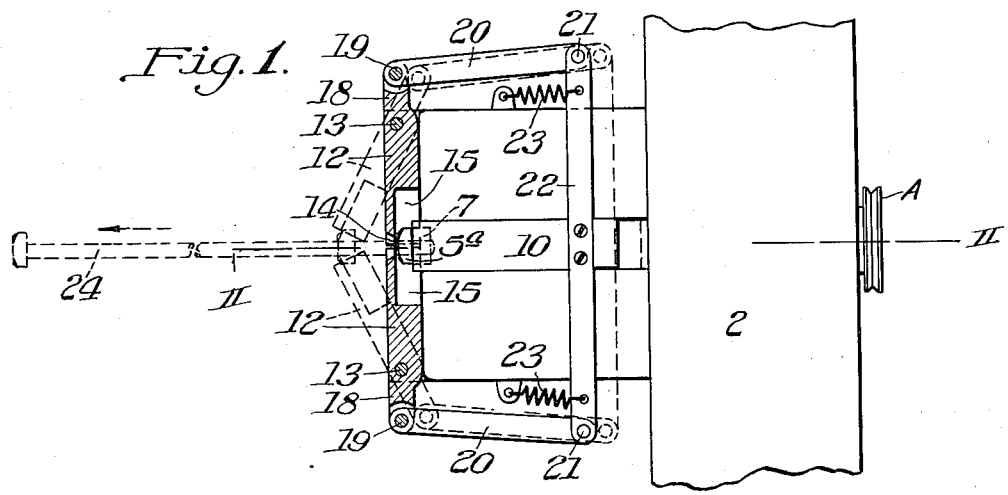
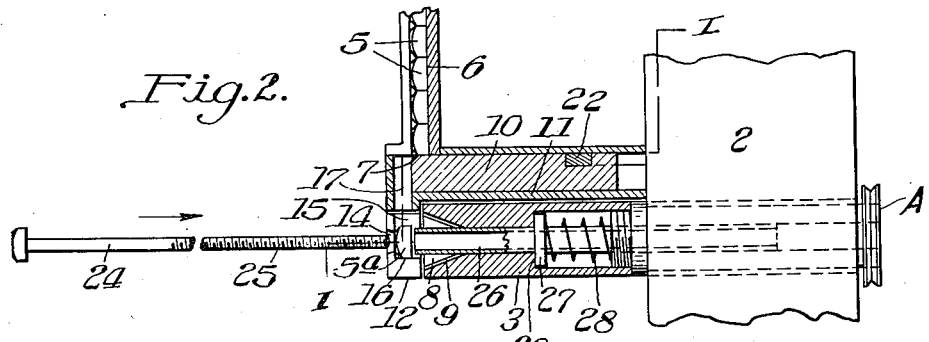
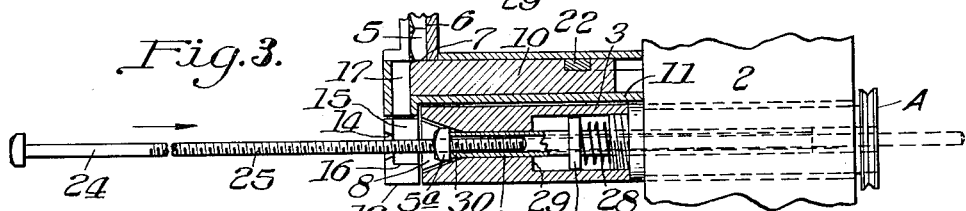
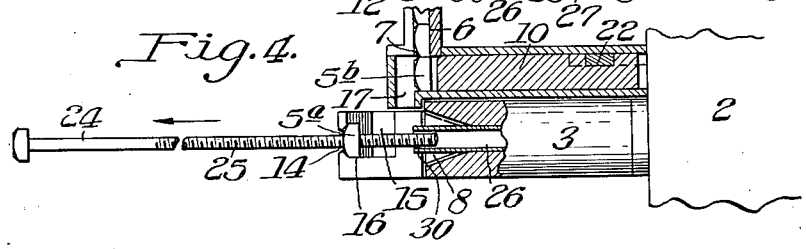
INVENTOR.
Elmer W. Lundell
BY Clarke & Woolittle
ATTORNEYS.

Patented July 7, 1936

2,046,520

UNITED STATES PATENT OFFICE 2,046,520

APPARATUS FOR APPLYING NUTS TO BOLTS

Elmer W. Lundell, Pittsburgh, Pa., assignor to Seyler Manufacturing Company, Pittsburgh, Pa., a corporation of Pennsylvania Application February 25, 1935, Serial No. 8,007

14 Claims. (Cl. 10—155)

This invention relates to new and improved apparatus for applying nuts to bolts, rods and the like, of various lengths and regardless of the thread lengths thereof; and contemplates a construction embodying a mechanically driven rotatable nut applying mechanism and automatic feed mechanism for conveying nuts into operative position for coaction with the applying mechanism and a bolt or rod to which the nut or nuts are to be applied.

Among the objects of the present invention are: to provide in a simple and durable machine, a new and improved automatic feed mechanism operable to successively position nuts so that they may be applied to bolts and/or rods, the operation of said feed mechanism being controlled by a movement of the bolt or rod to which a nut is applied; to provide new and improved means for feeding said nuts edgewise into operative position relatively to the bolt or rod; means for guiding a bolt or rod to engage the nut; and a new and improved rotatable nut holder designed for cooperation with the feed mechanism and the bolt.

Additional objects and advantages of my invention will become apparent from the following description taken in connection with the accompanying drawing, wherein:

Fig. 1 is a horizontal plan and sectional view, the section being indicated by the line I—I of Fig. 2, particularly showing the mechanism of the nut feeding shutters;

Fig. 2 is a vertical section taken on the line II—II of Fig. 1, showing a nut in position for application to a bolt;

Fig. 3 is a view similar to Fig. 2, showing the nut being applied to an inserted bolt; and Fig. 4 is a view like Fig. 3, showing the bolt and applied nut being withdrawn from the machine.

Referring to the drawing, 2 designates an upright frame or housing in which is mounted, by means of suitable bearings, a rotatable nut supporting holder or spindle 3. Threaded nuts 5 are supplied in any suitable manner from a source of supply (not shown), said nuts being introduced therefrom into a chute 6 wherein they are conveyed by gravity into position for engagement with the rotating member 3.

Member 3, as illustrated, projects forwardly from the housing 2 and has the front end thereof preferably disposed directly below and spaced from the lower open or delivery end 7 of the chute 6. The member is hollow and is provided with an outwardly divergent conical chuck or nut-receiving portion 8 at the front terminal end thereof, said portion 8 being preferably formed with radial grooves 9 for engagement with the corner portions of the nuts for rotating the same, as will be readily understood.

Interposed between the member 3 and the delivery end of the chute 6, I provide a reciprocable valve member 10 adapted for normally closing the open end of the chute, said member being movable on an abutment or wall 11.

A pair of hinged shutter members 12 normally extend transversely in front of the chuck portion 8 of the member 3, said shutters being pivoted at 13 to provide for opening and closing movements away from and toward the chuck and spindle. The shutters move over the chuck and have complementary semi-circular openings combining to form a circular bolt-receiving guide opening 14 in alinement with the axis of the chuck and member 3 when the shutters are closed.

Each of the shutters is cut away on its inner face to provide a nut-receiving recess 15 having a lower ledge 16 so disposed with respect to the chuck 8 as to support a nut 5a thereon disposed on an edge thereof, with the axis of the threaded bore of the nut substantially coincident with that of the chuck 8.

17 designates a communicating chute or passage disposed parallel to and offset with respect to the chute 6; this passage communicates at its lower end with the recess 15 of the shutters, the communication with the delivery end 7 of the chute 6 being normally closed by means of the valve member 10.

The shutters 12 are operatively connected with the valve member 10 in such a manner as to provide for controlling movement of the member 10 thereby. Thus, the end portions 18 of the shutters extend outwardly beyond their pivot points 13, and are pivotally connected at 19 with links 20, said links 20 having pivotal connection 21 by their other ends with a cross arm 22 secured to the valve member 10. 23 designates springs attached to the cross arm 22 for normally maintaining the valve 10 in position closing the outlet 7 of the nut chute 6, and the shutters 12 in closed position over the face of the chuck 8.

With a nut 5a positioned in the shutter recess 15, as in Fig. 2, a bolt 24 may be manually applied to the machine and engage the nut by inserting its threaded end 25 through the guide opening 14 in the shutters 12, and moving it into engagement with the threaded bore of the said nut, whereby the nut 5a is conveyed by said bolt into the tapered chuck portion 8 of the rotating member 3, until the corners of the nut engage with the grooves 9 of said chuck.

With the member 3 rotating in the correct direction for threading the nut on the bolt, the operator merely holds the bolt against rotation, and the chuck and member act as a power wrench for running the nut on the threads of the bolt to the extent desired by the operator. Any suitable means, as for example, a pulley A secured to said member 3, may be employed for rotating said member at the desired speed.

By making member 3 hollow the bolt may pass therethrough as indicated by the dotted line position in Fig. 3, and the nut 5a may therefore be applied to the limit of the thread 25 regardless of the length of said thread and/or bolt. When the nut has been run onto the threaded portion 25 of the bolt to the desired position, the operator merely retracts the bolt a sufficient distance to disengage the nut 5a from the chuck 8 of the rotating member.

26 designates a reciprocable hollow sleeve, centrally disposed within the member 3, having a collar 27 limiting forward movement of said sleeve under the action of a spring 28, by the engagement of said collar with an internal abutment 29 of the member. When the sleeve 26 is in its normal position, the forward terminal 30 thereof extends beyond the portion 8 and slightly into the recess 15 of the shutters 12, acting to assist in retaining the nut 5a on edge as in Fig. 2, preparatory to engagement of the nut by an inserted bolt and the movement thereof into the chuck 8, which movement of the nut takes place while it is in contact with the terminal 30. The sleeve 26 permits the passage of the bolt therethrough while the nut 5a is being applied, and further acts in conjunction with spring 28 to assist the disengagement of the nut from the chuck 8 upon retraction of the bolt by the operator.

It is noted that the bolt-receiving opening 14 in the shutters 12 is of such a diameter as to prevent the passage of the nut 5a therethrough, hence upon withdrawing the bolt 24 with its applied nut, the nut will engage the shutters to effect a pivotal outward opening movement thereof, as indicated in dotted lines in Fig. 1 and as illustrated in Fig. 4. This movement of the shutters 12 is in turn imparted to the valve member 10 through the links 20 and the cross arm 22, whereby the member 10 is retracted a sufficient distance to uncover the delivery end 7 of the chute 6, as shown in Fig. 4. The nuts 5 in said chute gravitate downward and the lowermost nut 5b of the column comes to rest on the abutment 11 in front of the valve member 10.

When the bolt or rod 24 has been withdrawn sufficiently to disengage its applied nut 5a from contact with the open shutters, the shutters are closed by the action of the springs 23, which movement of the shutters returns the valve member 10 to its normal position, closing the delivery end of the chute 6.

The return movement of member 10 will displace the nut 5b from the abutment 11 and deliver it to the passage 17 wherein said nut gravitates into the recess 15 of the shutters, coming to rest in an upright position on the ledge 16 in the position of the previously applied and removed nut 5a, where the same may be engaged by a bolt and applied thereto by the rotating member 3 as described.

It will therefore be seen that by means of my invention nuts are readily and easily applied to the threaded ends of bolts, which bolts may be inserted into the machine by the operator. The withdrawal of a bolt and its applied nut automatically loads or charges the machine with a new nut from the supply source in readiness to be applied. In practice, a plurality of nuts may be applied to a single bolt or rod by repeated insertions of the bolt or rod into the machine; this procedure is very desirable in connection with preparing certain types of bolts or rods for shipment, some of which must be equipped with as many as four nuts. In addition it is desirable that these several nuts be located on the bolt in spaced relation, and by means of my invention, the operator may selectively apply the same by varying the degree of insertion of the bolt in the machine.

I claim:

1. In apparatus for applying nuts to bolts and the like, the combination with a rotatable nut-receiving member, of a nut feeding mechanism for positioning a nut in relation to said member, whereby the nut may be engaged by an inserted bolt and conveyed thereby into contact with the rotatable member, said feeding mechanism being actuated by the movement of withdrawal of the bolt therefrom.

2. In apparatus for applying nuts to bolts and the like, the combination with a rotatable nut-receiving member, of a nut feeding mechanism for positioning a nut in relation to said member, whereby the nut may be engaged by an inserted bolt and conveyed thereby into contact with the rotatable member, said feeding mechanism including means movably disposed in front of said member for actuation by the movement of withdrawal of the bolt.

3. In apparatus for applying nuts to bolts, rods and the like, the combination with a rotatable nut holder, of a nut feeding mechanism including valve means for successively positioning individual nuts in line with the rotatable holder, whereby successive nuts may be engaged by an inserted member and moved into engagement with the nut holder, and means disposed in the path of movement of said nuts for actuating said valve means.

4. In apparatus for applying nuts to bolts, rods and the like, the combination with a rotatable nut holder, of guide means positioned in advance of the nut holder, a nut feeding mechanism including valve means for successively positioning individual nuts in line with the rotatable holder, whereby successive nuts may be engaged by an inserted member and moved into engagement with the holder, said guide means being operatively connected with the valve means and actuated by a movement of the member.

5. In apparatus for applying nuts to bolts and the like, the combination with a rotatable member having a nut-receiving portion, of a nut feeding mechanism therefor including a valve for releasing nuts individually from a source of supply, means disposed in front of the nut-receiving portion for receiving the individual nuts in position to be engaged by an inserted bolt and conveyed thereby into said portion, said control valve being actuated by the movement of withdrawal of the bolt.

6. In apparatus for applying nuts to bolts and the like, the combination with a rotatable member having a nut-receiving chuck portion, of means providing a supply of nuts therefor, a feeding mechanism for delivering individual nuts from said supply into position to be engaged by an inserted bolt and conveyed thereby into said chuck, said mechanism comprising a valve for individually releasing the nuts from the supply, a movable member disposed in front of the chuck having a nut-receiving recess therein, and means operatively connecting said valve and member for movement of the valve by the member, said member being adapted to be actuated by the movement of withdrawal of the bolt.

7. In apparatus for applying nuts to bolts and the like, the combination with a rotatable nut-receiving member, of a nut feeding mechanism therefor for positioning a nut in relation to the member, whereby said nut may be engaged by an inserted bolt and coneveyed thereby into contact with the rotatable member, said rotatable member being hollow for passage of the bolt therein during the application of the nut by said member, said feeding mechanism being actuated by the movement of withdrawal of the bolt therefrom.

8. In apparatus for applying nuts to bolts and the like, the combination with a rotatable member having a nut-receiving chuck portion, of an open-ended chute supplying nuts therefor, a valve normally closing said chute, a hinged shutter member normally disposed transversely in front of the chuck and having a recess therein for receiving a nut from the chute, said shutter being adapted to be engaged and actuated by the withdrawal of a nut after being applied to a bolt by the rotatable member, a linkage operatively connecting said valve and shutter for movement of the valve by the shutter, and a spring normally maintaining the valve in position closing the chute and the shutter transversely of the chuck.

9. In apparatus for applying nuts to bolts and the like, the combination with a rotatable member having a nut-receiving chuck portion, of an open-ended chute supplying nuts therefor, a valve normally closing said chute, a pair of hinged shutters normally disposed in front of the chuck in closed position and having an abutment for receiving a nut edgewise thereon from the chute, said shutters having complementary openings at their adjacent ends forming a bolt-receiving guide opening in alinement with the axis of the spindle, said opening being of a size preventing the passage of a nut therethrough, links connecting the shutters and the valve for movement of the valve by the shutters, and a spring for maintaining said valve and shutters in their normal positions.

10. In apparatus for applying nuts to bolts and the like, the combination with a hollow rotatable member having a nut-receiving chuck portion, of an open-ended chute supplying nuts therefor, a valve normally closing said chute, said valve being movable on an abutment immediately below and spaced from the said open end of the chute, a pair of hinged shutters normally disposed in front of the chuck in closed position and having portions on the inner faces thereof forming a nut-receiving ledge, links operatively connecting said valve and shutters, said shutters being actuated by the withdrawal of a bolt and its applied nut to first move the valve to open position, permitting a nut to gravitate from the chute onto the valve abutment, and then returning said valve to normal position to displace the said nut for gravitating delivery to the shutters, where said nut is received on the ledge thereof in edgewise position.

11. In apparatus for applying nuts to bolts and the like, the combination with a hollow rotatable member having a nut-receiving chuck portion, of a pair of hinged apertured shutters mounted transversely in front of the chuck and having a nut-receiving recess, a spring pressed hollow sleeve reciprocable in the rotatable member and extending into the shutter recess, means for delivering a nut from a supply source to said recess and into edgewise position in front of the sleeve, whereby a bolt may be inserted through the shutter aperture into engagement with the threaded bore of the nut to convey said nut into the chuck while in contact with the sleeve, said means being actuated by a movement of the shutters.

12. In apparatus for applying nuts to bolts and the like, the combination with a rotatable nut-receiving member, of means disposed in front of the member and having a portion for receiving a nut in edgewise position thereon, and means for delivering a nut to and actuated by a movement of said first means.

13. In apparatus for applying nuts to bolts and the like, the combination with a rotatable nut-receiving member, of hinged shutters disposed in front of the member and having a portion for receiving a nut in edgewise position thereon, and means for delivering a nut to the shutters actuated by a movement of said shutters.

14. In an apparatus for applying nuts to bolts and the like, the combination with a rotatable nut-receiving member, of a member movably disposed adjacent said rotatable member for receiving and positioning a nut in alinement therewith, and means for delivering a nut to and actuated by a movement of said movable member.

ELMER W. LUNDELL.